UNITED STATES PATENT OFFICE.

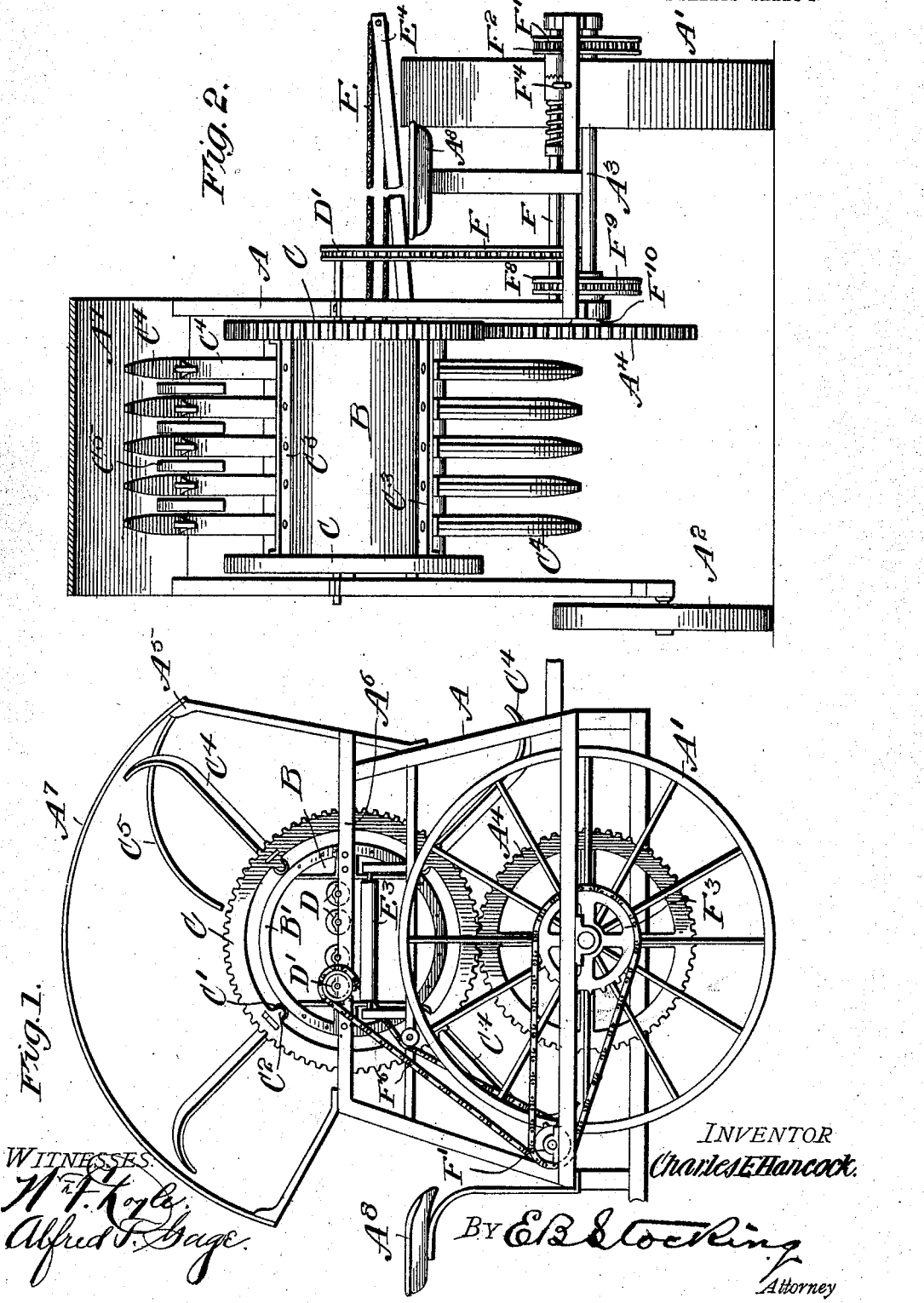

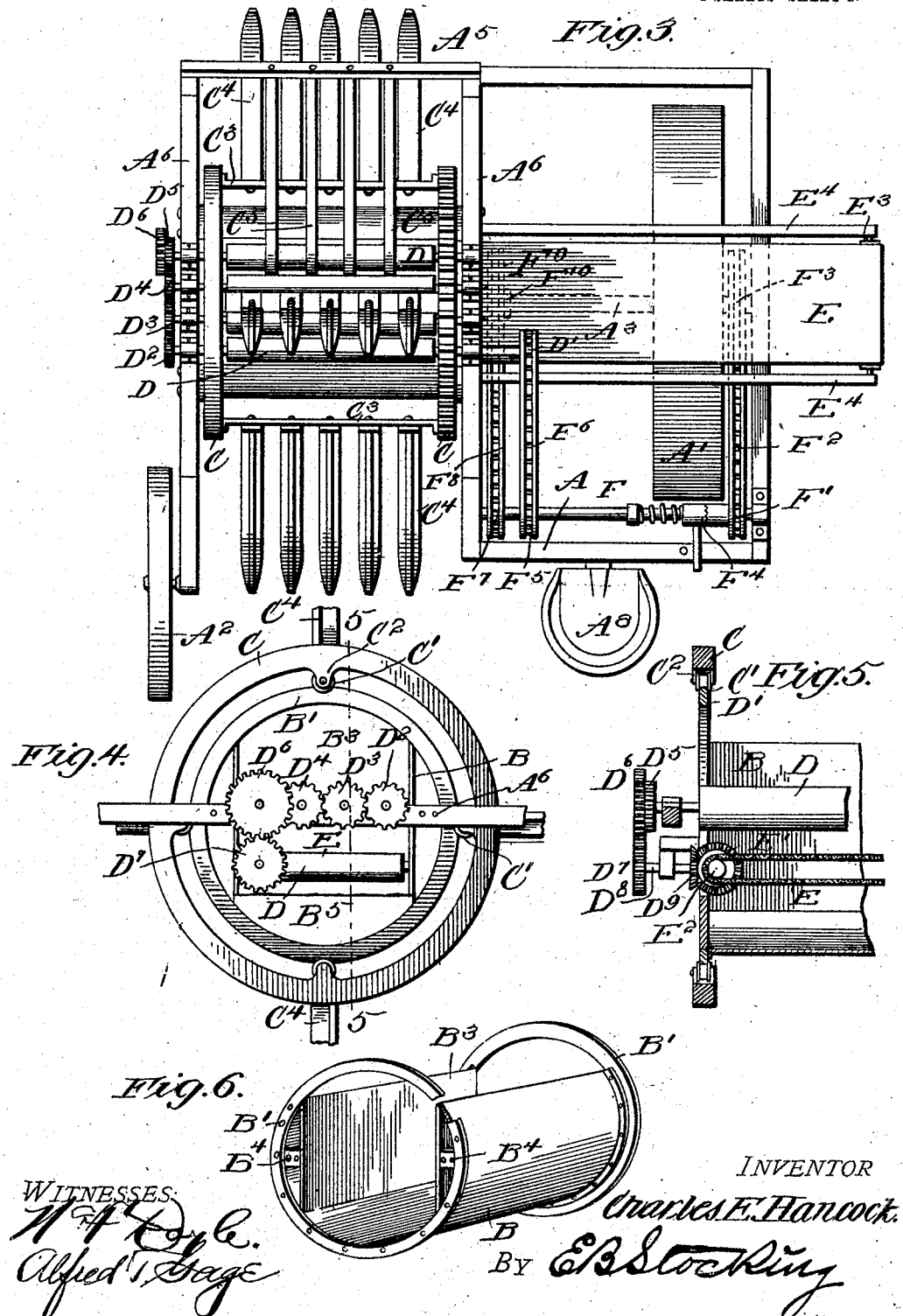

CHARLES E. HANCOCK, OF MARION, INDIANA, ASSIGNOR OF ONE-HALF TO C. ROE HALL, OF PALESTINE, TEXAS.

CORN PICKER AND HUSKER.

No. 815,817.  Specification of Letters Patent.  Patented March 20, 1906.

Application filed June 14, 1905. Serial No. 265,266.

*To all whom it may concern:*

Be it known that I, CHARLES E. HANCOCK, a citizen of the United States, residing at Marion, in the county of Grant, State of Indiana, have invented certain new and useful Improvements in Corn Pickers and Huskers, of which the following is a specification, reference being had therein to the accompanying drawings.

This invention relates to a corn picker and husker, and particularly to a structure wherein the ears of corn are delivered directly from the picker-arms to husking-rolls.

The invention has for an object to provide a novel construction and arrangement of parts whereby the husking device is supported in position relative to the picker-arms so that the ears of corn when dropped by said arms enter the husking device.

A further object of the invention is to mount the picker-arms upon a rotatable frame traversing a drum containing the husking-rolls and also a reticulated conveyer beneath these rolls through which any corn accidentally shelled by the rolls passes, while the husks and ears are carried thereby and discharged at one side of the machine.

Other and further objects and advantages of the invention will be hereinafter set forth and the novel features thereof defined by the appended claims.

In the drawings, Figure 1 is a side elevation of the invention; Fig. 2, an end view thereof with the hood in section; Fig. 3, a plan view; Fig. 4, a detail side elevation at the opposite end from Fig. 1, showing the drum and parts carried thereby; Fig. 5, a vertical section on the line 5 5 of Fig. 4, and Fig. 6 a detail perspective of the drum.

Like letters of reference refer to like parts in the several figures of the drawings.

The letter A designates a frame, which may be of any desired construction or configuration suitable for supporting the parts to be carried thereby and is provided at one side with a traction-wheel $A'$ and at its opposite side with a wheel $A^2$ to support that portion of the frame. The wheel $A'$ is provided with a driving-shaft $A^3$, from which power is transmitted to picker-arms mounted upon a drum or receptacle B, which carries the husking-rolls, by any desired means—for instance, a gear $A^4$, journaled on the shaft $A^3$, meshing with a similar gear C, forming an annular frame and mounted to rotate upon the circular frame $B'$ of the drum B. Any desired character of bearing may be provided for this frame C—for instance, rollers $C'$, pivotally mounted in inwardly-projecting lugs $C^2$ and seated upon the frame $B'$ of the drum B, as shown in Figs. 4 and 5. At the opposite end of the drum the gear-teeth are omitted from the frame C, and these opposite frames are connected together by cross-bars $C^3$, upon which the spaced picker-arms $C^4$ are secured in any desired manner. These bars are disposed at different distances apart upon the frames C and in their rotation travel completely around the drum B. The frame A of the machine is provided at one end thereof with a suitable cross-bar $A^5$, upon which the stripping-fingers $C^5$ are secured and disposed intermediate of the arms $C^4$ and preferably in a downwardly-extending curve, as shown in Fig. 1, so as to cause all material carried by the arms to be stripped therefrom and deposited upon the husking-rolls D, disposed within the drum and mounted at their opposite ends upon the bars $A^6$, carried by the frame. The upper portion of the machine may, if desired, be covered by a suitable hood $A^7$, as shown in Figs. 1 and 2.

The drum or receptacle B may be formed of any desired shape; but a preferable construction thereof is herein shown, wherein the annular frames $B'$ at the opposite ends are secured to the sheet-metal plates forming the bottom and side walls of the drum, as shown in Fig. 6, and leaving the open top portion $B^3$. The side walls of the drum or receptacle are turned inward and connected to the frame by plates $B^4$, which are also adapted to be secured to the frame $A^6$ in order to retain the receptacle against movement thereon. This receptacle is also provided with suitable end walls $B^5$ in order to form a chamber therein for the reception of any shelled corn which passes through the conveyer.

The rolls D within the drum are mounted in any desired manner upon the bars $A^6$ and driven from a gear $D'$, mounted upon the end of one of the rolls next the traction-wheel, and this motion is transmitted between said rolls in order to secure their rotation toward each other by means of the gears $D^2$, $D^3$, $D^4$, and $D^5$, carried upon the opposite ends of said rolls. For the purpose of driving the reticulated conveyer-belt E, which is mounted beneath the rolls, the gear $D^5$ is provided with a gear $D^6$, adapted to mesh with a coöperating gear $D^7$, carried upon a shaft $D^8$, which at its lower end is provided with a beveled gear $D^9$, meshing with the beveled pinion $E'$, carried upon the driving-shaft $E^2$, over which the conveyer E passes. The opposite end of this conveyer extends outward over the traction-wheel and there passes over a suitable roll $E^3$, carried by the frame $E^4$, mounted upon the machine-frame, as shown in Figs. 2 and 3.

Any desired means may be used for conveying power from the shaft of the traction-wheel to the parts to be driven thereby; but I herein illustrate a desirable form thereof in which a counter-shaft F is mounted in the frame at one side of the shaft $A^3$ and provided with a sprocket-gear $F'$, loosely mounted thereon and connected by a sprocket-chain $F^2$ with a sprocket $F^3$, carried upon the driving-shaft $A^3$ beyond the wheel $A'$. Adjacent to the sprocket $F'$ a suitable clutch mechanism, keyed upon the shaft F, is provided, as shown at $F^4$, and this shaft has secured thereto a sprocket $F^5$, which is connected by a chain $F^6$ with the wheel $D'$ for driving the first of the series of husking-rolls D, hereinbefore described. The shaft F is also provided with a second sprocket-wheel $F^7$ secured thereto, which is geared by a chain $F^8$ to a sprocket $F^9$, carried by a hub $F^{10}$, loosely mounted upon the shaft $A^3$ and having secured thereto the driving-gear $A^4$ for the frame C, as hereinbefore described. The frame A may be provided with any suitable form of seat, as shown at $A^8$.

In the operation of the invention the machine in its movements over the ground drives the picker-arms in an opposite direction to its travel, so that the arms pass at opposite sides of the stalks and strip therefrom the ears of corn, which are carried in the movement of the arms and discharged therefrom by the fingers interposed between the arms, so that they fall upon the husking-rolls disposed within the drum or receptacle permanently carried by the frame. After the passage of the husks through these rolls the accidentally-shelled corn is adapted to drop through the conveyer and the ears delivered from the ends of the rolls, while the husks and other material are carried outward to one side and discharged beyond the driving-wheel of the machine. It will be seen that the annular frames carrying the picker-arms are so mounted upon the drum or receptacle as to freely rotate around the same and to discharge directly from the arms into said receptacle, while the construction and arrangement of the rolls within the receptacle, in connection with the conveyer driven therefrom, provide a simple, efficient, and economical construction of parts adapted to accomplish the objects of a combined corn picker and husker in the most efficient manner.

Having described my invention and set forth its merits, what I claim, and desire to secure by Letters Patent, is—

1. In a device of the class described, a frame, picker-arms rotatably mounted thereon, a receptacle disposed within the arc of rotation of said arms and a husking device arranged within said receptacle to receive material discharged from said arms.

2. In a device of the class described a frame, picker-arms rotatably mounted thereon, a receptacle disposed within the arc of rotation of said arms, a husking device arranged within said receptacle to receive material discharged from said arms, and a husk-conveyer arranged within the receptacle and beneath said device to discharge therefrom.

3. In a device of the class described, a frame, a drum mounted thereon and having an open portion, picker-arms mounted to rotate around the drum to discharge into the open portion of said drum, and a husking device within said drum.

4. In a device of the class described, a frame, a drum mounted thereon and having an open portion, picker-arms mounted to rotate around the drum to discharge into the open portion of said drum, husking-rolls within said drum, and a conveyer beneath said rolls and discharging at one end of said drum.

5. In a device of the class described, a frame, a drum mounted thereon and having an open portion, picker-arms mounted to rotate around the drum to discharge into the open portion of said drum, husking-rolls within said drum, and a reticulated conveying-apron disposed longitudinally beneath said rolls.

6. In a device of the class described, a frame, a drum mounted thereon and having an open portion, picker-arms mounted to rotate around the drum to discharge into the open portion of said drum, husking-rolls within said drum, a reticulated conveying-apron disposed longitudinally beneath said rolls, and stripping-fingers supported by the frame intermediate of the picker-arms, and extended toward the open portion of said drum.

7. In a device of the class described, a frame, a drum mounted thereon and having an open portion, picker-arms mounted to rotate around the drum to discharge into the open portion of said drum, husking-rolls within said drum, a reticulated conveying-apron disposed longitudinally beneath said rolls, stripping-fingers supported by the frame intermediate of the picker-arms, a traction-wheel and shaft, a driving-gear upon said shaft, a counter-shaft geared to said driving-gear, and means extending from the counter-shaft to rotate said picker-arms.

8. In a device of the class described, a frame, a drum mounted thereon and having an open portion, picker-arms mounted to rotate around the drum to discharge into the open portion of said drum, husking-rolls within said drum, a reticulated conveying-apron disposed longitudinally beneath said rolls, stripping-fingers supported by the frame intermediate of the picker-arms, a traction-wheel and shaft, a driving-gear upon said shaft, a counter-shaft geared to said driving-gear, means extending from the counter-shaft to rotate said picker-arms, a driving connection from said counter-shaft to the husking-rolls, and a gearing extending from the husking-rolls to the conveyer beneath the same.

9. In a device of the class described, a frame, a drum supported thereon and provided with an opening at its top, an annular frame having a roller-bearing upon said drum and a gear upon its outer periphery, and picker-arms carried by said annular frame.

10. In a device of the class described, a frame, a receptacle mounted thereon provided at its opposite ends with annular tracks or ways, a body portion connecting these tracks or ways, an annular frame having rollers mounted upon said tracks, and picker-arms carried by said annular frame.

11. In a device of the class described, a frame, a receptacle mounted thereon provided at its opposite ends with annular tracks or ways, a body portion connecting these tracks or ways, annular frames having rollers mounted upon said tracks, picker-arms carried by said annular frames, a cross-bar extending between the annular frames at opposite ends of the body, picker-arms secured to said bar and spaced from each other, and stripping-fingers supported by a frame disposed intermediate of said arms.

12. In a device of the class described, a frame, a traction-wheel mounted therein, a counter-shaft parallel with the shaft of the traction-wheel, a driving-gear upon the traction-wheel shaft for transmitting power to the counter-shaft, a receptacle mounted upon the frame, husking-rolls within said receptacle, a driving connection extending from the counter-shaft to one of said rolls, a rotatable frame provided with picker-arms and mounted upon said receptacle to travel around the same, a gear for driving said rotatable frame loosely mounted upon the shaft of the traction-wheel, and a driving connection from the counter-shaft to said frame-gear.

13. In a device of the class described, a frame, a traction-wheel mounted therein, a counter-shaft parallel with the shaft of the traction-wheel, a driving-gear upon the traction-wheel shaft for transmitting power to the counter-shaft, a receptacle provided with husking-rolls, a driving connection extending from the counter-shaft to one of said rolls, a rotatable frame provided with picker-arms and mounted upon said receptacle to travel around the same, a gear for driving said rotatable frame loosely mounted upon the shaft of the traction-wheel, a driving connection from the counter-shaft to said frame-gear, intermediate gears carried by the shafts of said rolls, a conveyer disposed beneath the rolls, and a driving connection extending from the shaft of one roll to a driving-roll for said conveyer.

In testimony whereof I affix my signature in presence of two witnesses.

CHARLES E. HANCOCK.

Witnesses:
 CHAS. R. BRUNT,
 JESSIE WADE.